United States Patent
Bennion

(10) Patent No.: US 10,091,694 B1
(45) Date of Patent: Oct. 2, 2018

(54) DEVICE PAIRING OVER DIFFERENT NETWORKS

(71) Applicant: Western Digital Technologies, Inc., Irvine, CA (US)

(72) Inventor: Matthew Bennion, Dana Point, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 728 days.

(21) Appl. No.: 14/287,421

(22) Filed: May 27, 2014

Related U.S. Application Data

(60) Provisional application No. 61/951,964, filed on Mar. 12, 2014.

(51) Int. Cl.
*H04W 36/00* (2009.01)
*H04W 12/06* (2009.01)
*H04B 11/00* (2006.01)

(52) U.S. Cl.
CPC ....... *H04W 36/0066* (2013.01); *H04W 12/06* (2013.01); *H04B 11/00* (2013.01)

(58) Field of Classification Search
None
See application file for complete search history.

(56) References Cited

U.S. PATENT DOCUMENTS

| | | |
|---|---|---|
| 6,499,054 B1 | 12/2002 | Hesselink et al. |
| 6,732,158 B1 | 5/2004 | Hesselink et al. |
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |

(Continued)

*Primary Examiner* — Henry Tsang
(74) *Attorney, Agent, or Firm* — Chang & Hale LLP

(57) ABSTRACT

In some embodiments a pairing system is configured to obtain first fingerprint data from a media playback device operating on a first network and second fingerprint data from a mobile device operation on the second network. The pairing system can, based on the fingerprint data, determine whether to pair the media playback device on the first network to the mobile device on the second network. The first and second fingerprint data may be generated during an interaction between the media playback device and the mobile device. In one embodiment, the pairing system creates a data conduit for connecting the media playback device on the first network to the mobile device on the second network.

22 Claims, 2 Drawing Sheets

(56) References Cited

U.S. PATENT DOCUMENTS

| | | | |
|---|---|---|---|
| 8,711,656 B1* | 4/2014 | Paulson | H04B 11/00 |
| | | | 367/135 |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 2005/0015618 A1* | 1/2005 | Schneider | H04W 12/06 |
| | | | 726/4 |
| 2005/0144195 A1 | 6/2005 | Hesselink et al. | |
| 2005/0144200 A1 | 6/2005 | Hesselink et al. | |
| 2008/0113619 A1* | 5/2008 | Torrance | G08C 17/00 |
| | | | 455/41.2 |
| 2009/0117890 A1 | 5/2009 | Jacobsen et al. | |
| 2012/0036041 A1 | 2/2012 | Hesselink | |
| 2013/0139218 A1* | 5/2013 | Roulland | G06F 21/42 |
| | | | 726/3 |
| 2013/0212401 A1 | 8/2013 | Lin | |
| 2013/0265857 A1* | 10/2013 | Foulds | G08C 23/02 |
| | | | 367/199 |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0173215 A1 | 6/2014 | Lin et al. | |

* cited by examiner

DEVICE PAIRING OVER DIFFERENT NETWORKS

CROSS-REFERENCE TO RELATED APPLICATIONS

This application claims priority to U.S. Provisional Application No. 61/951,964, entitled "DEVICE PAIRING OVER DIFFERENT NETWORKS," filed on Mar. 12, 2014, which is herein incorporated by reference in its entirety.

BACKGROUND

With greater numbers of devices operating on multiple networks, intercommunication between devices can be difficult to setup. For example, mobile phones can often operate on two different types of networks (e.g., a local area network over Wi-Fi and a cellular network). As mobile devices move from network to network, users may want those devices to communicate with other devices, such as speakers, displays or other media playback devices, located on local networks. However, users may face difficulties configuring their mobile device to communicate with those local devices, particularly if those users are not administrators of the local network.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally, wireless speakers or other playback devices can pair with mobile devices on the same network as they can directly communicate with each other. However, if the speaker and the mobile device are on different networks, pairing is much more difficult. For example, people at a party, meeting or convention may have mobile devices operating on different networks but may want to connect to a playback device on a local network. However, the people may not have the credentials (e.g., password or account) to access the local network. Thus, a pairing system that allows devices on different networks to pair with each other can provide a beneficial user experience by making it easier for one device to control and/or playback media content on another device.

Figure 1:
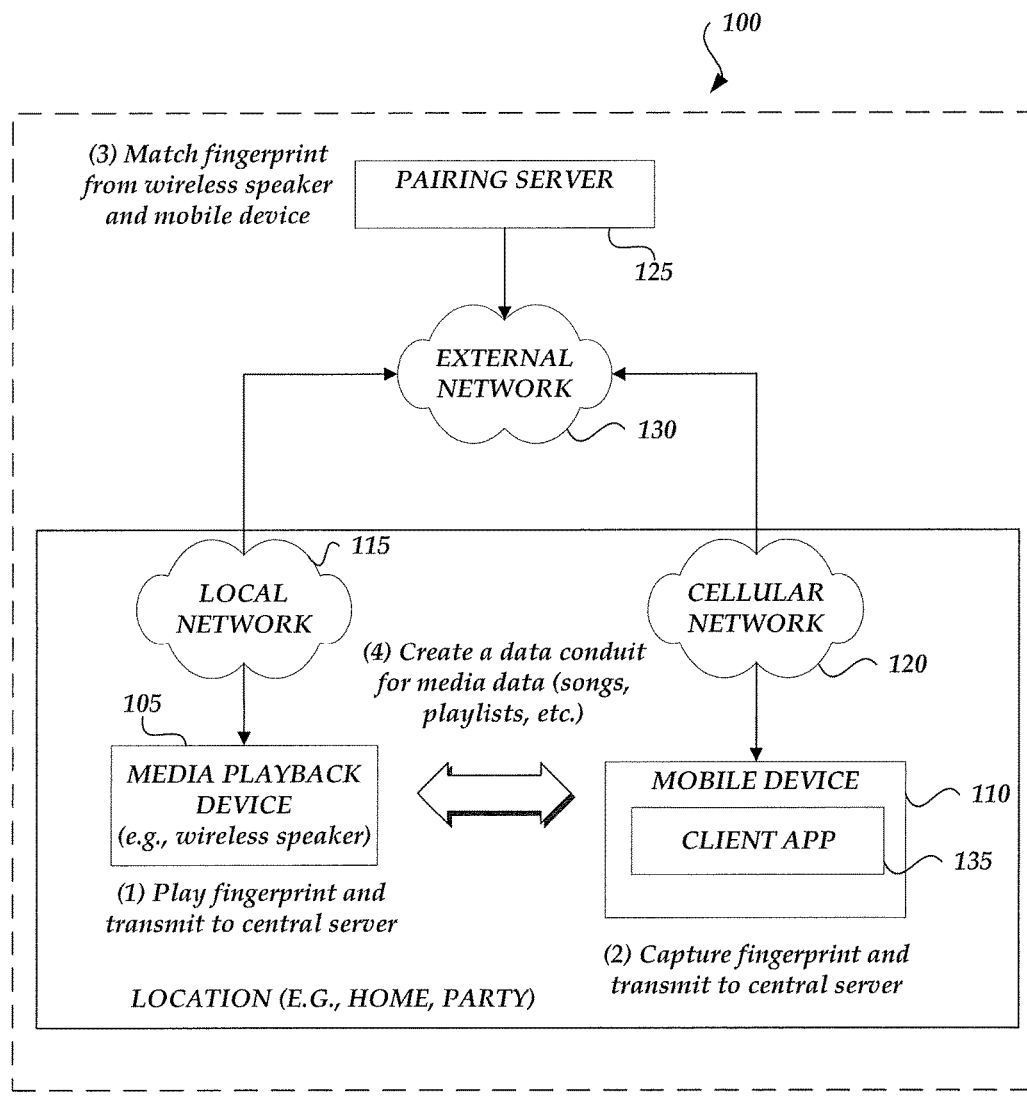
FIG. 1 illustrates a block diagram of an embodiment of a pairing system that pairs mobile devices with media playback devices.

FIG. 1 illustrates one embodiment of a pairing system 100 capable of allowing wireless speakers or other media playback devices 105 (e.g., smart TV, media player, displays, etc.) to be paired with a controlling computing device even if the devices are on different networks. For simplicity, the disclosure will mainly discusses the scenario of a mobile device 110 (e.g., smart phones, tablets, notebooks, wearable computers or the like) operating with a wireless speaker 105; though the pairing system can work with other types of devices. In one example scenario, the speaker 105 may be on a local area network (LAN) 115 while the mobile device is connected online via a cellular network 120. In other embodiments, the first and second networks 115, 120 may be other types of networks. For example, using audio, visual or other type of data fingerprints generated during a pairing process, a pairing server 125 (having one or more processors and a computer readable storage medium) can identify which mobile device 110 and wireless speaker 105 are attempting to pair and then can create a data conduit that traverses the different networks.

In some embodiments, the pairing system 100 pairs a controlling device (e.g., mobile device 110) operating on a first network with a playback device 105 (e.g., wireless speaker) operating on a second network. In one embodiment, the pairing system pre-registers the wireless speaker and a client application ("app") 135 on the mobile device 110 with a pairing server 125 (e.g., a server and/or cloud service on the Internet). When the wireless speaker and the mobile device are in the same location (e.g., at a party or at home), a pairing process can be initiated for the speaker and the mobile device, for example, by pressing a button on the playback device 105 and on/or the client app 135.

In one embodiment of the pairing process, at operation (1), the wireless speaker emits 105 a unique audio cue (e.g., randomly generated noise) or generates a visual cue (e.g., by flashing light emitting diodes (LEDs) in a certain pattern) to create a fingerprint for the wireless speaker. In one embodiment, the speaker also transmits the fingerprint data (e.g., the fingerprint itself or data representative of the fingerprint, such as a hash) over the Internet to the pairing server 125.

In an embodiment, at operation (2), the client app 135 is configured to detect the fingerprint (e.g., via a camera and/or a microphone), record the fingerprint, and send the fingerprint data to the pairing server 125.

Other embodiments of operation 1 and 2 are possible. For example, the interaction between the media playback device 105 and the mobile device 110 may be reversed. In one embodiment, the mobile device emits a fingerprint and sends first fingerprint data to the pairing server. Meanwhile, the media playback captures the emitted fingerprint, generates second fingerprint data based on the emitted fingerprint and sends the second fingerprint data to the pairing server.

At operation (3), the pairing server 125 can then match the fingerprints, determining which wireless speaker and mobile device are attempting to pair together. The pairing server 125 may also obtain location data (e.g., from a GPS or Wi-Fi signal) from the mobile device and/or wireless speaker to narrow down candidate devices for pairing.

At operation (4), the pairing server 125 can then set up a data conduit (e.g., network tunnel, Virtual Private Network (VPN), etc.) between the wireless speaker and the mobile device so that content can be played from the mobile device to the wireless speaker. In an embodiment, the data conduit may use encryption to provide an encrypted data path for securely transporting data. In one embodiment, the data conduit traverses the different networks the speaker and the mobile device are operating on. For example, the data conduit may be formed from the wireless speaker to its local network, to an external network 130 (e.g., the Internet), to a cellular network, to the mobile device.

In another embodiment, the pairing server 125 may cause the mobile device and the wireless speaker to form a local data conduit that forms a direct communication path between the devices. For example, the pairing server 125 may direct the mobile device and the wireless speaker to form an ad hoc wireless network by providing connection instructions to both devices. Other communication interfaces (e.g., Bluetooth or other types of wireless protocols)

may also be used to create the local data conduit using a local communication channel.

Figure 2:
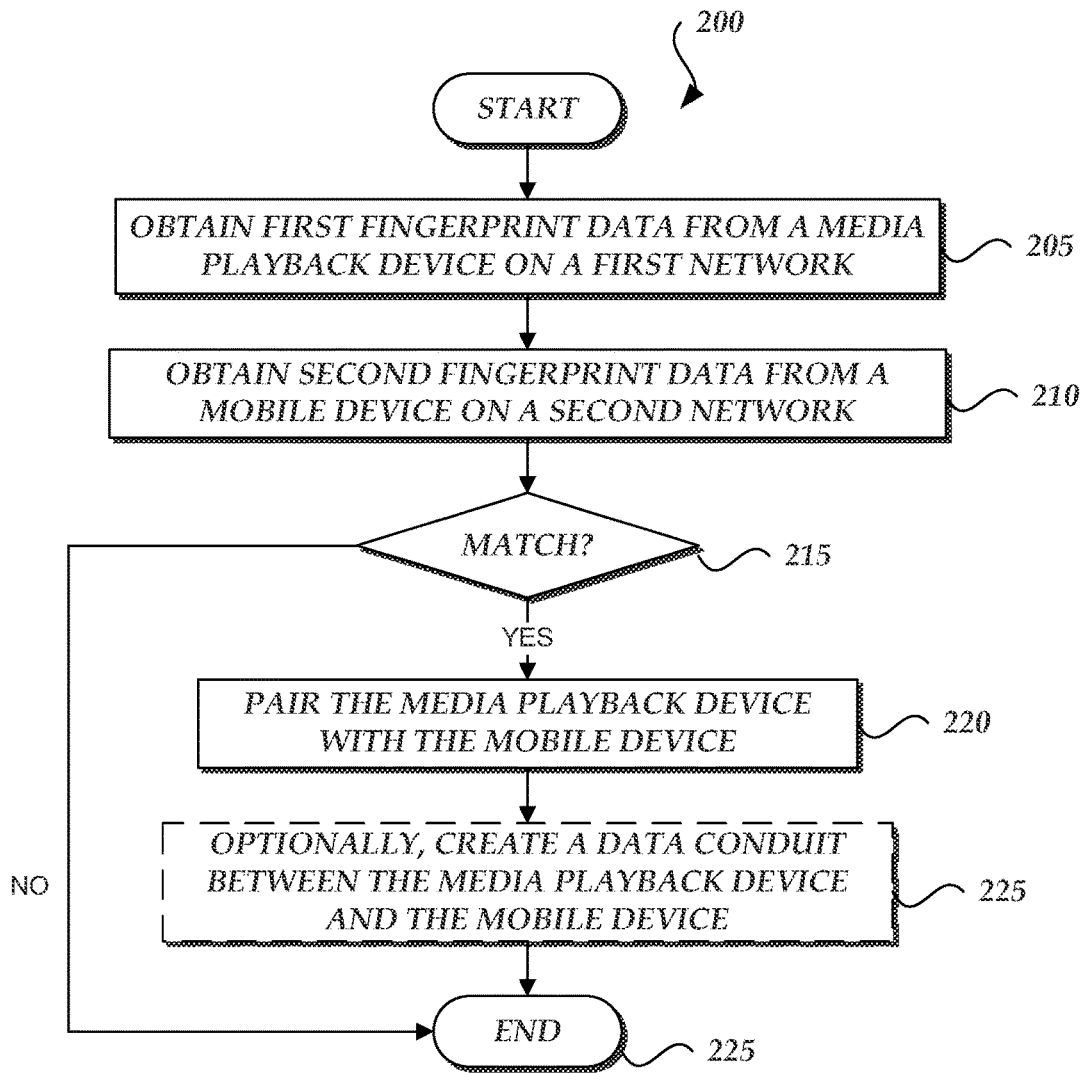
FIG. 2 illustrates a flow chart of an embodiment of a pairing process implementable by the pairing system of FIG. 1.

FIG. 2 illustrates a flow chart of an embodiment of a pairing routine 200. In some implementations, the routine is performed by embodiments of the pairing system 100 or by one of its components, such as the pairing server 125. For ease of explanation, the following describes the routine as performed by the pairing server 125. The routine is discussed in the context of an example scenario that is intended to illustrate, but not to limit, various aspects of the pairing system.

Beginning at block 205, the pairing server 125 obtains first fingerprint data from a media playback device 105 on a first network (e.g., a local network 115). As described above, the first fingerprint data may be generated from an audio, visual, or other type of cue, such as blinking LEDs or white noise.

At block 210, the pairing server 125 obtains second fingerprint data from a mobile device 110 on a second network (e.g., a cellular network 120). In one embodiment, the first fingerprint data and second fingerprint data are generated during an interaction between the media playback device 105 and the mobile device 110, such that first and second fingerprint data can be matched together (e.g., the fingerprints may be the same or complimentary to each other).

At block 215, the pairing server 125 determines whether the first and second fingerprints match or otherwise correspond to each other. If the fingerprints do not match, the routine 200 can proceed to block 225 and end. In one embodiment, the pairing server 125 may repeat the routine for various different fingerprints it receives until it finds a match.

If the fingerprints match, the routine 200 can proceed to block 220 and pair the media playback device with the mobile device so that the devices can communicate with each other.

At block 220, the pairing server 125 may, optionally, create a data conduit between the media playback device and the mobile device for transmitting data between them. The data conduit may be local or may traverse multiple different networks. The media playback device and mobile device can then transmit data (such as playlists, account information, media, etc.) to each other via the data conduit.

Various implementations of the pairing system 100 are possible. For example, while the above has discussed speakers and mobile devices, the pairing system could work with other devices. For example, the pairing system could pair a tablet or wearable computer with a smart television.

In one embodiment, a pairing system is configured to separately obtain fingerprint data from a controlling device and a playback device, wherein one of the devices communicated the fingerprint data to the other and the devices are located on different networks. The pairing system determines if the controlling device and the playback device should be paired based at least partly on the fingerprint data. The pairing system then causes a data conduit to be formed between the controlling device and the playback device.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for pairing a mobile device with a media playback device, the system comprising:
   a pairing server configured to be operatively connected to an external network, the pairing server comprising circuitry configured to:
      obtain first fingerprint data from a media playback device operating on a first network operatively connected to the external network;
      obtain second fingerprint data from a mobile device operating on a second network operatively connected to the external network;
      determine that the first fingerprint data corresponds to the second fingerprint data; and
      in response to the determination, pair the media playback device on the first network to the mobile device on the second network,
   wherein at least one of the first fingerprint data and the second fingerprint data is generated based on only a randomly generated noise played during an audio interaction between the media playback device and the mobile device,
   wherein the pairing server is different from the media playback device and the mobile device.

2. The system of claim 1, wherein the circuitry is further configured to create a data conduit connecting the media playback device on the first network to the mobile device on the second network.

3. The system of claim 2, wherein the data conduit comprises an encrypted data path between the first network and the second network.

4. The system of claim 2, wherein the data conduit comprises a local communication channel between the media playback device and the mobile device.

5. The system of claim 1, wherein:
the first fingerprint data corresponds to a fingerprint emitted by the media playback device; and
the second fingerprint data is generated from capture of the fingerprint by the mobile device.

6. The system of claim 1, wherein:
the second fingerprint data corresponds to a fingerprint emitted by the mobile device; and
the first fingerprint data is generated from capture of the fingerprint by the media playback device.

7. The system of claim 1, wherein the audio interaction comprises:
emitting an audio cue comprising the randomly generated noise by the media playback device; and
capturing the emitted audio cue by the mobile device.

8. The system of claim 1, wherein the audio interaction comprises:
emitting an audio cue comprising the randomly generated noise by the mobile device; and
capturing the emitted audio cue by the media playback device.

9. The system of claim 1, wherein:
the first fingerprint data is based on a hash of the randomly generated noise; and
the second fingerprint data is generated based on a capture of the randomly generated noise.

10. The system of claim 1, wherein:
the second fingerprint data is based on a hash of the randomly generated noise; and
the first fingerprint data is generated based on a capture of the randomly generated noise.

11. The system of claim 1, wherein the randomly generated noise comprises white noise.

12. A method for pairing a mobile device with a media playback device using a server, the method comprising:
obtaining first fingerprint data from a media playback device operating on a first network operatively connected to an external network;
obtaining second fingerprint data from a mobile device operating on a second network operatively connected to the external network;
determining that the first fingerprint data corresponds to the second fingerprint data; and
in response to the determination, pairing the media playback device on the first network to the mobile device on the second network,
wherein at least one of the first fingerprint data and the second fingerprint data is generated based on only a randomly generated noise played during an audio interaction between the media playback device and the mobile device,
wherein the server is different from the media playback device and the mobile device.

13. The method of claim 12, further comprising:
creating a data conduit connecting the media playback device on the first network to the mobile device on the second network.

14. The method of claim 12, wherein:
the first fingerprint data corresponds to a fingerprint emitted by the media playback device; and
the second fingerprint data is generated from capture of the fingerprint by the mobile device.

15. The method of claim 12, wherein:
the second fingerprint data corresponds to a fingerprint emitted by the mobile device; and
the first fingerprint data is generated from capture of the fingerprint by the media playback device.

16. The method of claim 12, wherein the audio interaction comprises:
emitting an audio cue comprising the randomly generated noise by the media playback device; and
capturing the emitted audio cue by the mobile device.

17. The method of claim 12, wherein the audio interaction comprises:
emitting an audio cue comprising the randomly generated noise by the mobile device; and
capturing the emitted audio cue by the media playback device.

18. The method of claim 12, wherein:
the first fingerprint data is based on a hash of the randomly generated noise; and
the second fingerprint data is generated based on a capture of the randomly generated noise.

19. The method of claim 12, wherein:
the second fingerprint data is based on a hash of the randomly generated noise; and
the first fingerprint data is generated based on a capture of the randomly generated noise.

20. The method of claim 13, wherein the randomly generated noise comprises white noise.

21. A non-transitory computer-readable medium storing computer-readable instructions that, when executed by a processor on a server, instruct the processor to perform a process comprising:
obtaining first fingerprint data from a media playback device operating on a first network operatively connected to an external network;
obtaining second fingerprint data from a mobile device operating on a second network operatively connected to the external network;
determining that the first fingerprint data corresponds to the second fingerprint data; and
in response to the determination, pairing the media playback device on the first network to the mobile device on the second network,
wherein at least one of the first fingerprint data and the second fingerprint data is generated based on only a randomly generated noise played during an audio interaction between the media playback device and the mobile device,
wherein the server is different from the media playback device and the mobile device.

22. The non-transitory computer-readable medium of claim 21, wherein the process further comprises:
creating a data conduit connecting the media playback device on the first network to the mobile device on the second network.

* * * * *